Oct. 11, 1960  E. W. ERNST ET AL  2,956,117
TELEFILM FREIGHT CAR IDENTIFICATION SYSTEM
Filed June 27, 1958  6 Sheets-Sheet 1
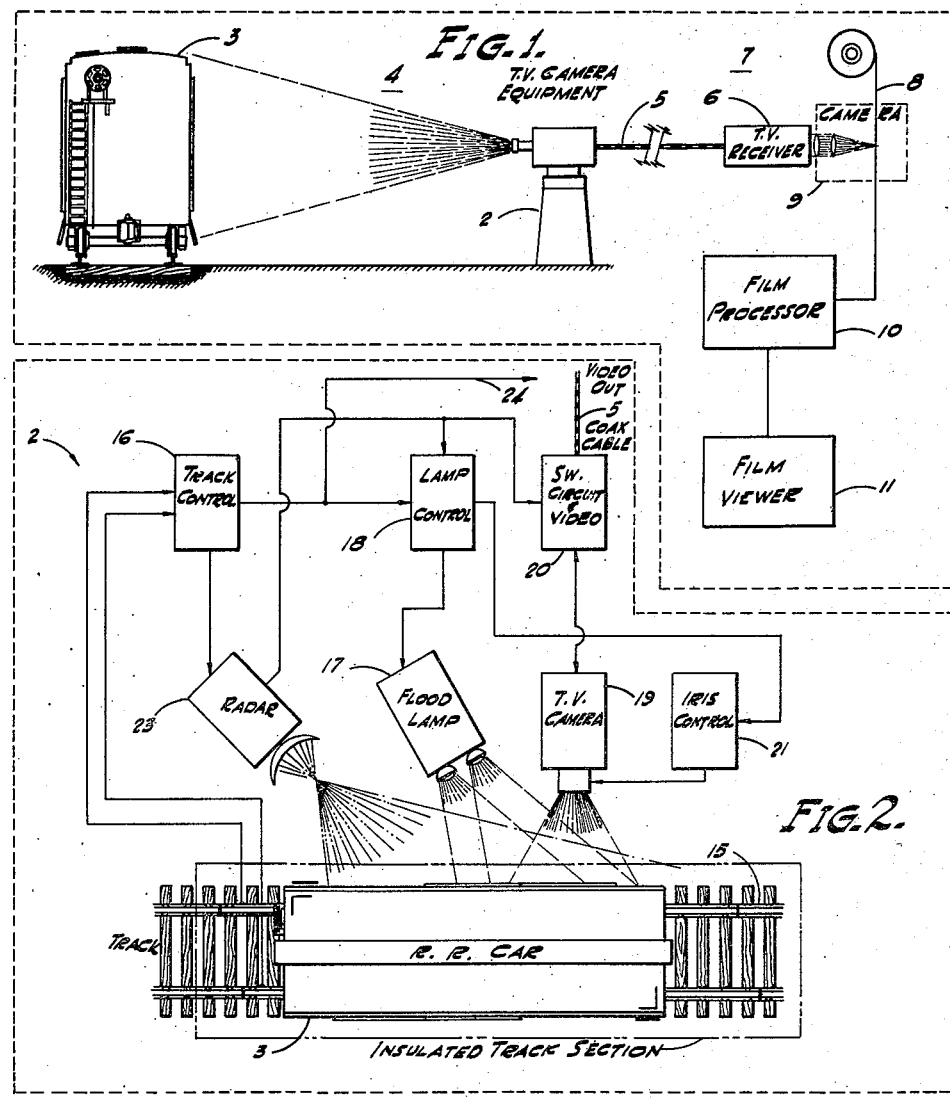
INVENTORS
JAMES R. HORSCH
JOHN J. MYERS
EDWARD W. ERNST
By John C. Black
ATTORNEY Oct. 11, 1960     E. W. ERNST ET AL     2,956,117
TELEFILM FREIGHT CAR IDENTIFICATION SYSTEM
Filed June 27, 1958     6 Sheets-Sheet 2
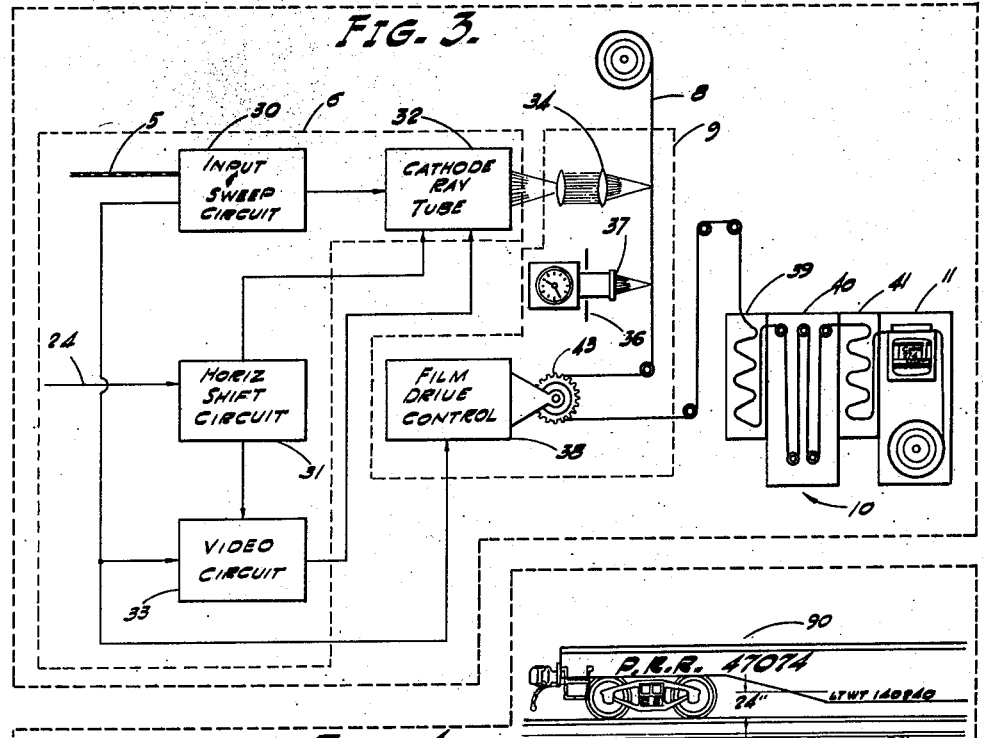
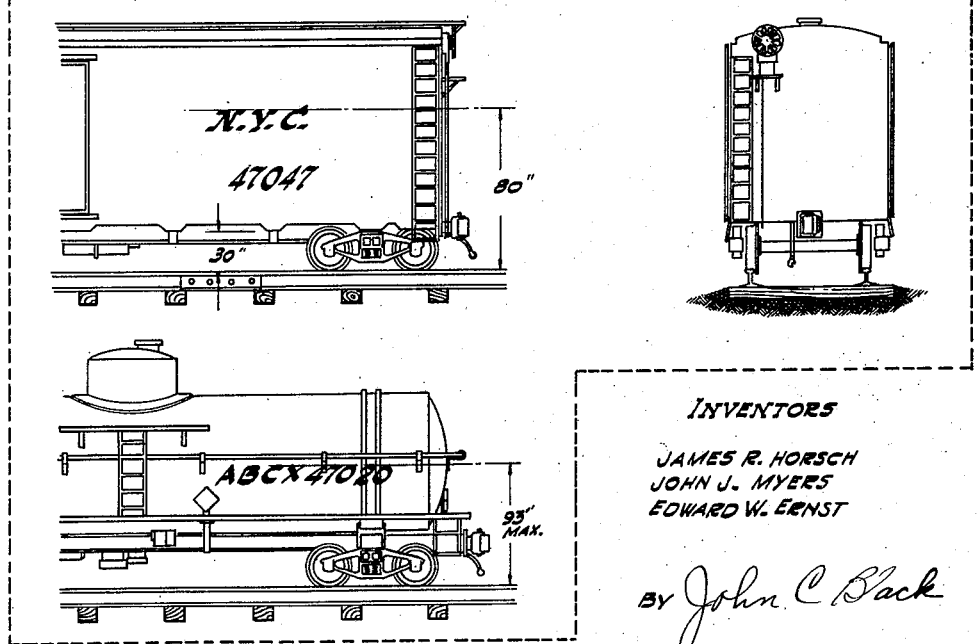
INVENTORS
JAMES R. HORSCH
JOHN J. MYERS
EDWARD W. ERNST
BY John C. Back
ATTORNEY

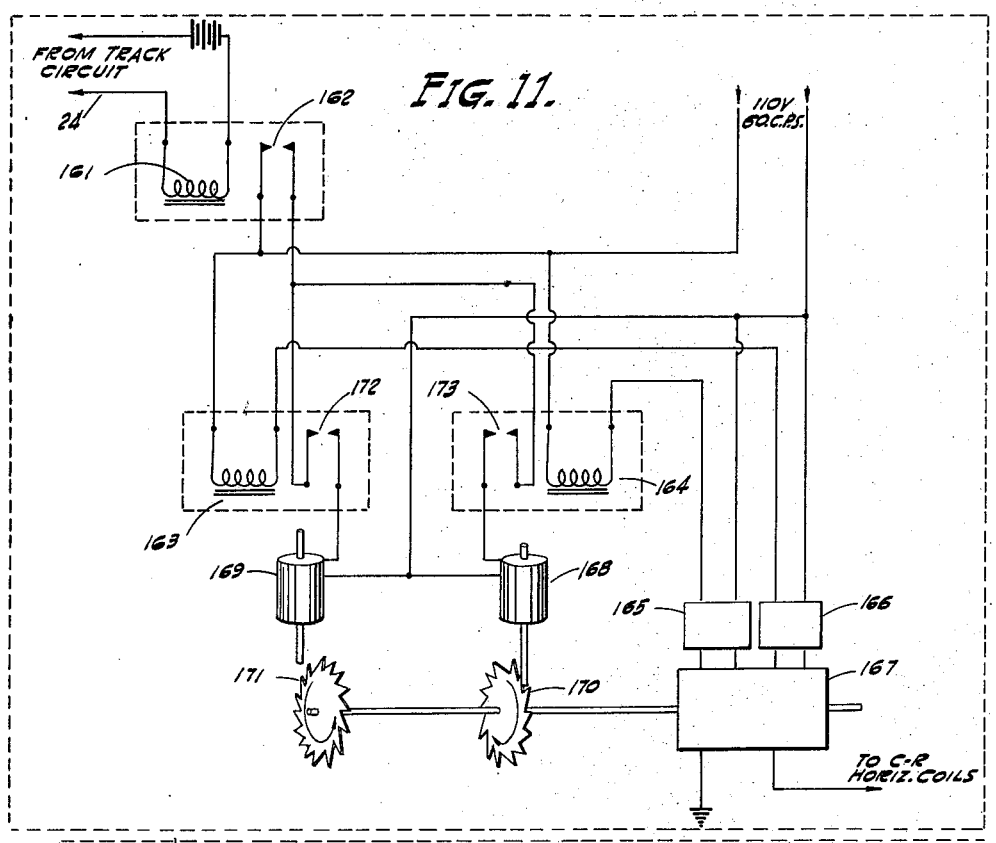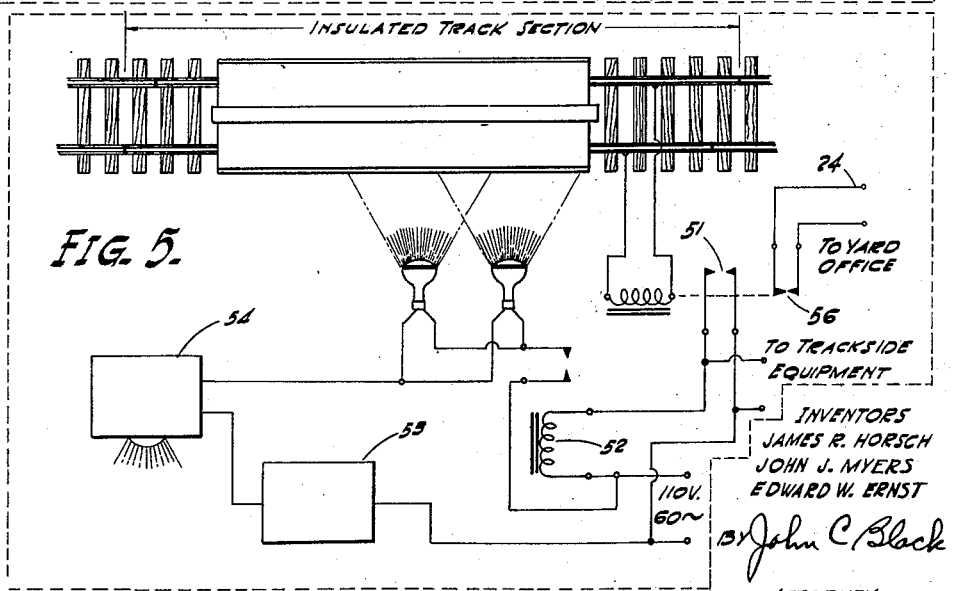

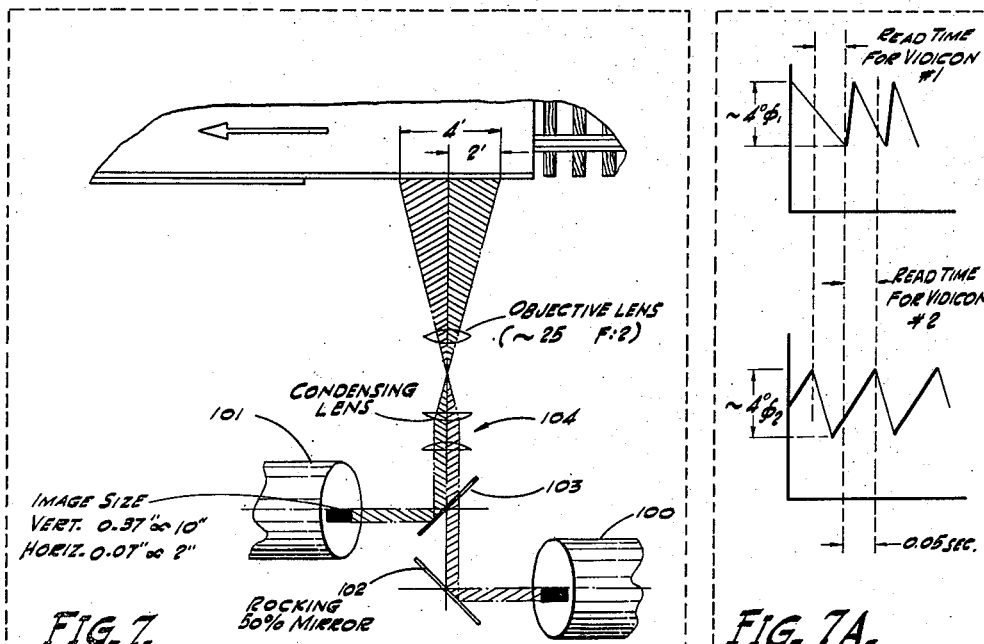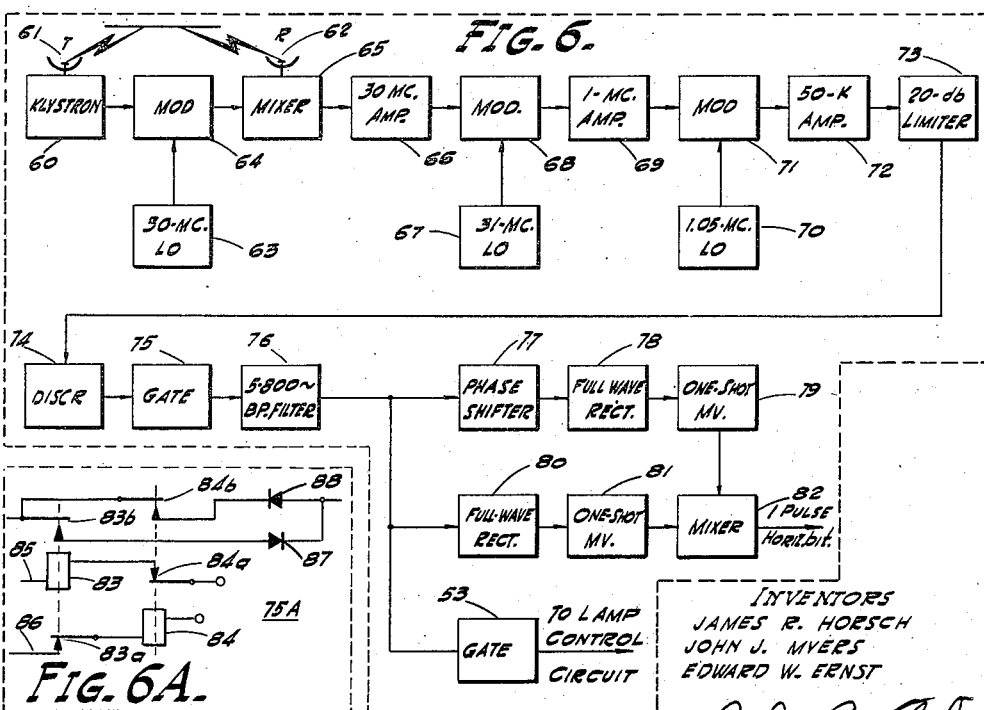

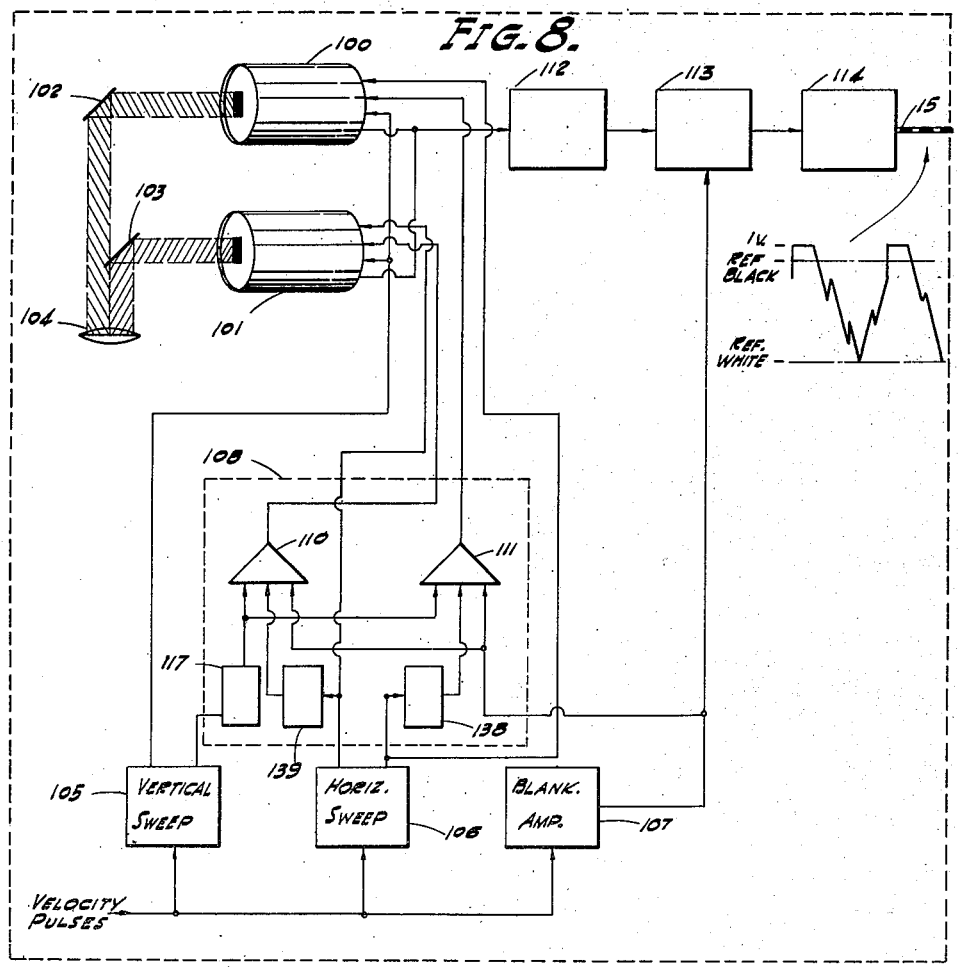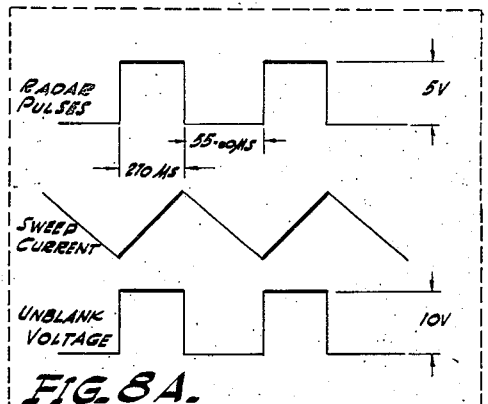

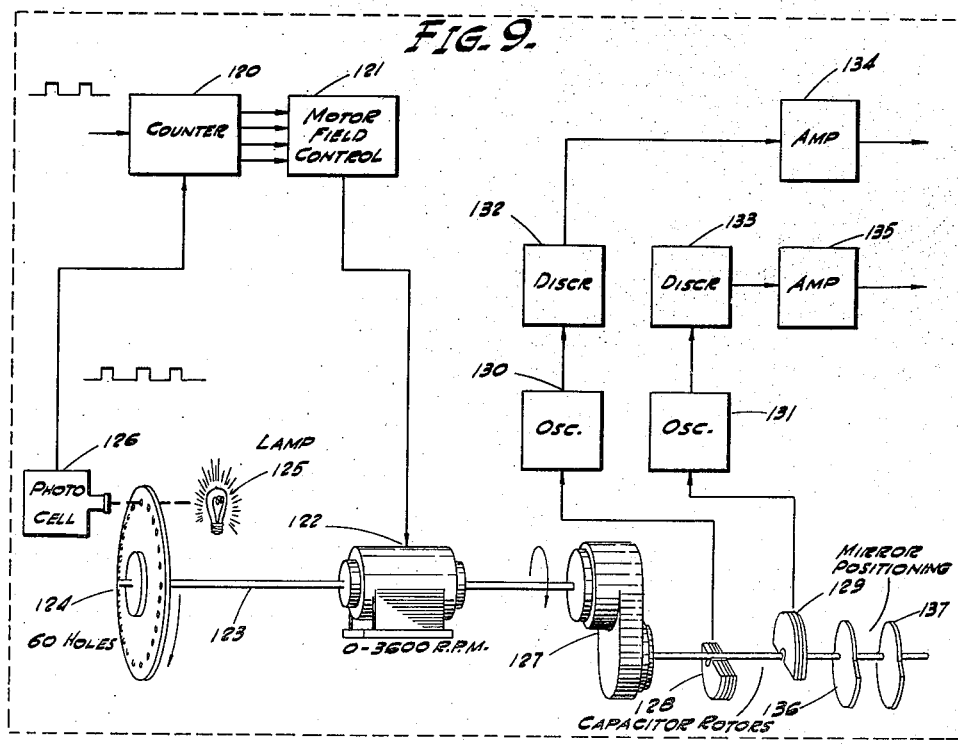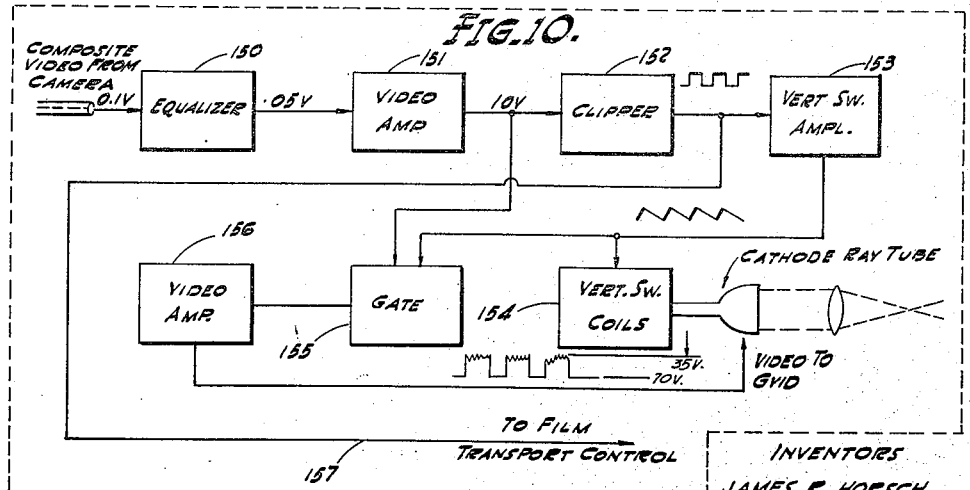

United States Patent Office 2,956,117
Patented Oct. 11, 1960

2,956,117

TELEFILM FREIGHT CAR IDENTIFICATION SYSTEM

Edward W. Ernst and James R. Horsch, Elmhurst, and John J. Myers, Champaign, Ill., assignors to Stewart-Warner Corporation, Chicago, Ill., a corporation of Virginia Filed June 27, 1958, Ser. No. 745,183

22 Claims. (Cl. 178—6.8)

This invention relates to an improved system for detecting and remotely recording information carried by objects passing a predetermined check point.

The present invention, referred to as the Telefilm Freight Car Identification System, has been particularly adapted for use by railroads.

The proposed Telefilm Freight Car Identification System produces on film for observation, within a few minutes after the event, a finished photographic record of trains passing a remote check point. The check point may be remote to the central viewing location by as much as several miles. The photographic record is used by a yard clerk for reading numbers and other information on the side of the engine and freight cars for the purpose of comparing the train make-up with the train consist (an orderly list of the cars in the train) received previously, for example by Teletype, and for other pertinent purposes.

The present system has been proposed as a means of automatically recording the desired car information in order to achieve an increase in speed of the identification process, to reduce errors of this process, and to effect economy by eliminating the need for yard clerks at trackside to read freight car initials and numbers.

The Telefilm Freight Car Identification System of the present application, differs from the conventional closed-loop television system now in use principally in its method of obtaining the scene in a manner which minimizes the reduction of legibility caused by smearing of a reproduced image by train motion. Commercially used television systems, which interlace two distinct fields, can provide legible records only of stationary and very slow moving objects. Thus, they can be used only when train velocity can be reduced to an almost prohibitive minimum. The proposed system, however, can be effectively utilized with train velocities at least as high as 35 m.p.h. The proposed system also has appurtenances such as film recording apparatus which is not normally a part of closed-loop television systems.

Briefly, the present system comprises trackside equipment, including a TV camera, and yard office equipment including a TV receiver and associated photographic apparatus. The trackside camera scans a passing railroad car in a series of vertical lines. Each of these lines is transmitted by wire to the receiver in the railroad yard office and is exposed across the width of film in the photographic apparatus. The train's motion supplies the horizontal scan at the TV camera. The film is moved in synchronism with the train's motion to provide the horizontal scan in the photographic apparatus. The exposed film is passed automatically into a rapid film developing unit which delivers, within a few minutes, a dry film ready for viewing in a microfilm-type viewer which is a part of the system. The operation of the equipment is automatic, except for the advancing of the film through the viewer under control of the yard clerk. In this way, one yard clerk centrally located in a railroad yard can replace a large number of similar clerks remotely located in the same yard using a more conventional system.

Accordingly, it is an object of the present invention to provide an improved system for reproducing information carried by objects moving past a predetermined check point.

It is a more specific object of the present invention to provide an improved system for comparing a railroad train make-up with a train consist list previously prepared for the train.

A further object of the present invention is the provision of a system for automatically reproducing information carried on the side of railroad cars as they pass a predetemined remote check point.

A more specific object of the present invention is the provision of a unique closed-loop television system including photographic equipment for automatically reproducing on film a continuous picture of railroad cars while they move past a remote check point.

A feature of the present invention is the provision of a TV camera of the charge storage type in which the vertical and horizontal sweep circuits are operated in synchronism with the movement of railroad cars which are being scanned by the camera.

Another feature of the present invention is the provision of a TV camera arrangement in which a pair of charge storage pickup tubes have alternate vertical sections of a passing train focused and kept stationary for a limited time upon their respective screens by a pair of oscillating mirrors operated in synchronism with the speed of the passing train.

Another feature of the present invention is the provision of TV camera apparatus of the type described above in which only a small section of the horizontal width of the pickup tube screens is used at any time and in which a horizontal shifting means sequentially changes the screen section, whereby the life of the pickup tubes is appreciably lengthened.

An additional feature is the provision of a TV receiver in which the cathode-ray tube displays on its screen only one vertical line at any time in one horizontal position and in which the horizontal position is sequentially shifted to succeeding horizontal positions incident to the passing of complete trains by the check point.

Another feature of the present invention is the focusing of succeeding vertical strips displayed on the cathode-ray tube screen upon succeeding vertical strips of film moved past the screen in synchronism with the train speed.

Another feature of the present invention is the use of a Doppler Radar unit for detecting the speed of the passing train and for producing pulses varying in frequency in proportion to the train speed for operating the TV camera apparatus, the TV receiver apparatus, and the photographic film drive means in synchronism with train speed.

Another feature is the provision of an artificial light source which is automatically controlled by a photocell, which is responsive to ambient light at the check point, and by the Doppler Radar apparatus to focus a desired amount of light upon the sides of the railroad cars being scanned.

Another feature of the present invention is the provision of apparatus for automatically and rapidly processing the film upon which the train information is reproduced.

Another feature is the provision of manually operable microfilm viewing apparatus for observing train information reproduced on film.

Another feature is the provision of an automatic TV camera iris control operated in accordance with the ambient light at the check point and the speed of the train being scanned.

Another feature of the present invention is the provision of a unique control means for the horizontal sweep coils of the TV camera pickup tubes and for controlling the movement of the photographic film.

Other objects and features will be evident upon a perusal of the following description in which:

Fig. 1 is a diagrammatic view of the applicants' system;

Fig. 2 is a diagrammatic view of the trackside equipment;

Fig. 3 is a diagrammatic view of the yard office equipment;

Fig. 4 shows partial views of the various types of railroad cars which will be photographically reproduced by the proposed system;

Fig. 5 shows the trackside lighting circuits;

Fig. 6 shows the Doppler Radar circuit diagrammatically;

Fig. 6A shows an alternative radar circuit in part;

Fig. 7 is a diagrammatic view of the TV camera optical system;

Fig. 7A shows a graph on which the optical system movement is plotted;

Fig. 8 shows the TV camera circuits diagrammatically;

Fig. 8A shows certain of the camera controlling wave forms;

Fig. 9 shows the TV camera horizontal sweep generator diagrammatically;

Fig. 10 shows the video transmission circuits diagrammatic together with typical output wave forms; and Fig. 11 shows the cathode-ray tube horizontal sweep circuit.

GENERAL DESCRIPTION OF SYSTEM

With particular reference to Fig. 1, it can be seen that the telefilm freight car identification system includes TV camera equipment 2 for scanning railroad cars 3 at a trackside check point 4. A suitable cable 5, such as Type RG 11/U solid dielectric coaxial cable, interconnect the camera equipment 2 with a TV receiver 6 at a remote yard office 7. A view of the sides of the cars 3 is reproduced in a manner to be described below upon the screen of the TV receiver 6.

Photographic film 8 is moved past the screen of the receiver 6 in synchronism with the movement of the cars 3. Car images displayed on the screen of the receiver 6 are focused by suitable photographic equipment 9 upon the moving film to reproduce the car images upon the film 8.

Suitable film processing equipment 10 is provided for automatically and rapidly developing the film 8. A manually controlled microfilm viewer 11 is provided for visual observation of the developed film 8.

Fig. 2 shows in greater detail certain of the TV camera equipment 2 located at the check point 4. The trackside check point 4 is provided with an insulated section of track 15 which is utilized in conjunction with a track control circuit 16 when a train passes over the insulated section to render the TV camera equipment operable.

The TV camera equipment 2 also includes an artificial light source 17 with its associated control circuit 18, a TV camera 19 and its associated sweep and video circuits 20, an iris control 21 for the TV camera 19, and Doppler Radar apparatus 23 for operating the system in synchronism with the speed of the cars 3. The lamp control circuit 18 includes a photosensitive device which controls the lamps and iris control for optimum scanning of the cars 3 by the camera 19. In addition to the video output cable 5, a circuit 24 interconnects the trackside equipment with the yard office equipment for a purpose to be described later.

With particular reference to Fig. 3, it can be seen that the video cable 5 and the circuit 24 terminate at the input to the TV receiver 6. The receiver 6 includes an input and sweep circuit 30, a horizontal shift circuit 31, a cathode-ray tube 32 and a video circuit 33.

The photographic camera equipment 9 includes a suitable lens means 34 for focusing the entire width of the cathode-ray tube screen at one vertical line in a predetermined horizontal position past which the film 8 moves. The camera equipment is also provided with a clock 35 and an appropriate shutter 36 and lens 37 for causing the time of arrival of each train to be recorded on the film 8 slightly in advance of the reproduced image of the train. The photographic camera equipment 9 also includes a film drive control 38 which will be described in detail later.

The film processing equipment 10 includes a first film storage bin 39, developing apparatus 40, and a second film storage bin 41. The film processing equipment 10 may be any one of many types well-known in the art which automatically develops exposed film when a slack film condition occurs at the film input for example, storage bin 39. The film viewer 11 may be any one of a number of microfilm viewers well-known in the art.

The operation of the equipment shown in Figs. 1, 2 and 3 is briefly as follows:

When a train approaches the insulated track section 15, the track control circuit 16 readies the trackside equipment for operation. The iris of the TV camera 19 is adjusted to the correct aperture by the iris control 21 which is responsive to the photo cell 22 which in turn responds to the ambient light at the trackside check point 4. In the event that the ambient light is below some predetermined value, the artificial light control circuit 18 causes the artificial light source 17 to illuminate check point 4.

When the train reaches a position in which it is detected by the Doppler Radar 23, the TV camera 19 is controlled by synchronizing pulses from the radar apparatus 23 to begin transmission of video signals over the cable 5 in a manner to be described later for reproducing the train image. Output synchronizing pulses from the radar apparatus 23 are also mixed with the output of the TV camera for transmission over the cable 5.

The composite video signals in the cable 5 are received by the TV receiver 6. The video signals are amplified and applied to the grid of the cathode-ray tube 32. The radar synchronizing pulses mixed with the video signals control the vertical sweep portion of the cathode-ray tube sweep circuits 30.

The rate at which the vertical sweep coils are operated is arranged such that only one vertical line appears on the cathode-ray tube screen at any given time. The horizontal sweep circuit of the cathode-ray tube is not operated at any time during the reproduction of a train image on the cathode-ray tube screen. Thus the vertical sweep line appears at the same horizontal position at all times during the reproduction of the train image.

However, each time that a train approaches the insulated track section 15, the track control circuit 16 closes the circuit 24 to cause the vertical sweep line of the cathode-ray tube to appear at the next succeeding horizontal position, whereby the life of the tube is greatly increased.

The radar synchronizing pulses are also used to drive the film at a rate proportional to the train's velocity. The cathode-ray tube spot is focused on moving film exposing it across its width. Thus, each succeeding vertical sweep line produced at the cathode-ray tube screen is exposed upon a succeeding transverse section of the film 8.

DETAILED DESCRIPTION

*Trackside control circuits*

With particular reference to Fig. 5, it can be seen that the track control circuit 16 comprises an obvious circuit including the cars 3 which is completed to operate a relay 50 incident to a train passing over the insulated track section. Operation of the relay 50 closes contacts 51 which connect a conventional power supply to the plate circuits of the electronic components of the trackside equipment. The heaters of the various electronic devices in the trackside equipment, however, are continuously connected to an appropriate source of voltage so as to eliminate any delay time between the arrival of a train and the effective operation of the equipment.

Closure of the contacts 51 also completes an obvious circuit for operating a second relay 52, which partially prepares the artificial light circuit 18 (Fig. 2). When the Doppler Radar 23 produces output pulses incident to the detection of the train, it operates a gate circuit 53 (to be described below) to further prepare the control circuit 18 for the artificial light source. The circuit 18 also includes a conventional photosensitive device 54 which responds to the ambient light conditions at the trackside check point 4 to cause the artificial light source to be operated in the event that the ambient light is below a predetermined desired level. The photocell 54 output also operates the iris control 21 in a manner well-known in the art to adjust the TV camera iris to an optimum value.

*The Doppler Radar apparatus*

The present system requires a speed measuring device to provide operation of the TV camera, the TV receiver, and the film equipment in synchronism with the train's speed. Because of the requirements that an optimum system be inactive when a train stops and/or reverses motion during its passage in front of the camera and that the preferred embodiment of the system be insensitive to trains moving in a direction opposite from normal, rather stringent requirements are placed on the speed-sensing device. Devices, such as insulated sections of track or a multiplicity of light beams interrupted by the cars, are ruled out as not capable of the required resolution. Equipping each train with its own signal source is uneconomical; and, therefore, a passive speed sensing system appears to be preferable for optimum results.

A small continuous wave Doppler Radar is a simple system which fulfills the requirement. One radar which has been found suitable is a 10 milliwatt X-band system aimed at an angle with the tracks about 45° and looking at the train at the median height of the car trucks.

Pulses are generated by the radar at a rate proportional to train velocity. The constants of the system are arranged so that one output pulse from the radar occurs for the passage of each horizontal bit of information in front of the camera. If the train is passing in a direction to which the system is not sensitive, no output pulses are generated. For example, if the train stops, backs up, stops, and begins to move in the desired direction, no output pulses are generated during the intervals of no motion and reverse motion. These pulses are each used to initiate one complete vertical sweep by the TV camera and receiver tubes and to control the film advance mechanism at the yard office so as to advance the film one horizontal bit.

In order that each cycle of the returned Doppler frequency follow the previous cycle by a time which corresponds exactly to the period of the vertical sweep of the TV camera, a transmitted wave length of 0.72 centimeter is required. Since this is inconvenient from an equipment standpoint, the sweep is triggered at 4 times the Doppler frequency of a 2.88 centimeter transmitted wave length. Each cycle of the Doppler frequency is operated on to provide pulses at a rate of four pulses for each Doppler cycle. Figure 6 is illustrative of this technique.

For those installations which require operation of train motion into two opposite directions past the check point 4, the three superheterodyne conversions of Figure 6 are preferred for optimum operation. A train speed of 40 m.p.h. results in a Doppler frequency of approximately 800 c.p.s. which the equipment must be capable of resolving. The frequency (between 0 and 800 c.p.s.) produced by the train movement is either added to or subtracted from the transmitted frequency of the radar depending upon the direction of train movement. The output pulses of the radar are used in subsequent circuits to form the vertical sweep of the Telefilm camera and receiver, to control the mirrors of the Telefilm camera, to partially control the lighting circuit, and to control the photographic film advance.

More particularly, the Doppler Radar apparatus 23, which is shown diagrammatically in Fig. 6, includes a klystron circuit 60 connected to a transmitting antenna 61 to radiate energy toward the moving railroad car 3 which is to be scanned. The radiated energy is reflected from the moving car 3 and picked up by a receiving antenna 62. The frequency of the radiated energy picked up by the antenna 62 will be the radiated frequency of the klystron circuit plus or minus a low frequency $F_c$ (e.g., between 0 and 800 c.p.s.) depending upon the velocity and the direction of train movement.

The output of a first local oscillator 63, which may have a frequency of 30 mc., is fed to a modulator 64. The output of the klystron circuit is also fed to the modulator 64. The output of the modulator, which has a frequency equal to that of the klystron plus and minus 30 mc., is fed to a mixer 65. The radiated energy picked up by the antenna 62 is also fed to the mixer. The output of the mixer fed to a 30 mc. amplifier 66, thereby to produce an output of 30 mc. plus or minus $F_c$, the low frequency component caused by the motion of the car.

The output of the amplifier 66 and the output of a 31 mc. local oscillator 67 are fed to a modulator 68, the output of which is fed to a 1 mc. amplifier 69. Thus, as is well-known the output of the amplifier 69 will be 1 mc. plus or minus $F_c$. The output of amplifier 69 and the output of a 1.05 mc. local oscillator 70 are fed to a modulator 71, the output of which is fed to a 50 kc. amplifier 72. As is well-known, the output signal of the amplifier will be 50 kc. plus or minus $F_c$. This output is fed to a limiter circuit 73 to produce uniform signal strength and then to a discriminator 74 to demodulate the signal, producing an output signal of plus or minus $F_c$.

The output of the discriminator 74, which will be a series of positive or negative pulses at a frequency between 0 and 800 c.p.s., depending upon the direction and instantaneous speed of the train being scanned, is fed to a rectifier 75. The rectifier 75 passes either positive or negative pulses only depending upon the particular direction of train movement which is to be scanned.

The output pulses passed by the rectifier 75 are fed to a filter 76 which passes frequencies between 5 and 800 c.p.s. only, whereby train speeds less than .18 m.p.h. (which produce pulses at a frequency less than 5 c.p.s.) produce no output pulses by the radar circuit.

The output of the filter 76 is connected to a phase shifting circuit 77. The output of the phase shifter 77 is fed to a full wave rectifier 78, the output of which is connected to a one-shot multivibrator 79 which produces 270 micro-second output pulses.

The output of the filter 76 is also fed directly to a full wave rectifier 80, the output of which is connected to a one-shot multivibrator 81 that also produces 270 micro-second output pulses.

The output pulses of the two multivibrators 79 and 81 are fed to a mixer 82 which produces a series of output pulses of constant width (270 micro-seconds) that occur one pulse per horizontal bit passing the TV camera. The output pulse of the mixer 82 are used in circuits to be described below to form the vertical sweeps of the TV camera and the TV receiver, to control the movement of the TV camera mirrors, and to control the photographic film advance mechanism.

The output of the filter 76 is also connected to a gate circuit 53 which as described above controls in part the operation of the flood lamps.

Thus, it can be seen that, in the embodiment described, the Doppler Radar apparatus produces output pulses only when the passing train is moving in a predetermined direction past the check point 4 at a speed greater than .18 m.p.h., that one output pulse occurs for each horizontal bit of the train passing the TV camera, and that each pulse is of a constant 270 micro-second width which is equivalent to the optimum vertical sweep time of the TV camera tubes.

If desired, the Doppler Radar may be arranged to permit scanning of trains moving in either direction while still preventing scanning while the trains are stopped or backing up. For example, Fig. 6A shows a rectifier circuit 75A which will replace the rectifier 75 of Fig. 6 to accomplish the alternative mode of operation suggested immediately above.

The circuit 75A includes a pair of relays 83 and 84. Relay 83 is operated over a circuit including conductor 85 which is connected to an appropriate insulated section of track (not shown) adjacent the main section 15. Similarly, relay 84 is operated over a circuit including conductor 86 which is connected to an insulated section of track (not shown) adjacent the other end of section 15. The circuits for relays 83 and 84 also include break contacts 84a and 83a respectively.

Thus, it can be seen that if a train approaches from the direction of the track section associated with relay 83, relay 83 will be operated and will prevent subsequent operation of relay 84. Relay 83 will close contacts 83b to complete a circuit between the discriminator 74, a rectifier 87, and the filter 76 to pass pulses of one polarity.

Alternatively, as a train approaches from the opposite direction, relay 84 will be operated to prevent subsequent operation of the relay 83. Relay 84 will operate contacts 84b to complete a circuit between the discriminator 74, a rectifier 88 and the filter 76 to pass pulses of opposite polarity.

Thus, trains approaching from either direction can be scanned. To prevent premature release of relay 83 or 84, when operated, any convenient hold circuit (not shown) may be utilized, for example, a hold circuit controlled by the track control relay 50 (Fig. 5).

The Telefilm camera

Fig. 4 shows representative railroad cars with standard markings and approximate overall dimensions of interest in determining the requirements of this system. It is seen that from the lowest markings on a flat car 90 to the highest markings on a tank car 91, a vertical height of about 70" will be included. Inspection of a large number of freight cars in one railroad yard showed that many cars are not marked according to this standard plan, but rather the total vertical spread of markings is about 10 feet. Since the camera is preferably placed a minimum of 10 feet from the inside gauge of the rail as required by railroad standards, the minimum distance from the nearest part of the Telefilm camera 19 to the side of the car is about 7 feet. With allowance for hooding the lens, the required maximum angle of view is about 63 degrees, which is within the capabilities of relay lens systems commercially available.

The resolution required of the system is a function of the size of characters to be read, the speed of the train, and the vertical height over which the characters are spread. These parameters are approximately 2 inches, 40 m.p.h. and 10 feet, respectively.

It has been shown that, in order to minimally reproduce optimum-shaped characters, there are required 7 information bits vertically and 5 information bits horizontally. Taking 7 vertical bits as the acceptable value, then each vertical scan must resolve a total of 420 bits. For equal horizontal resolution a train travelling at 40 m.p.h. presents a minimum number of approximately 2500 bits per second. Thus, the number of bits per second for the fastest moving train must assume a minimum value of approximately 1,000,000. Considering, however, that characters painted on box cars will in general not be of optimum shape or style, it is necessary to allow at least 10 vertical bits per character and 7 horizontal bits. Therefore, the required band width at 40 m.p.h. is approximately 2 megacycles which is well within the spectrum of conventional television.

Transmission for distances of several miles over inexpensive solid-dielectric coaxial cable proceeds without undue equalization difficulty. Also, the resolution is within the capability of a standard television camera tube.

In order to obtain sensitivity and freedom from blur, it is essential that the television pickup device have a speed of response of the order of the reciprocal of the maximum repetition rate of the vertical scan. This requires a response time of about 330 microseconds. Camera tubes which possess a response time which is intrinsically this small have sensitivities which will serve orders of magnitude too low to allow useful application in the Telefilm Identification system.

Image orthicons and vidicons have adequate sensitivity but are an order of magnitude too slow.

The sensitivity of the vidicon, which is less than that of the image orthicon, requires that high light illumination on the target area should be about 3 foot-candles. This is well within the capability of an F 3.5 lens system and artifical light of about 100 foot-candles. However, the vidicon, for instance, will not register a change from black to white or vice versa to reach 80% of total change in less than about 50 milliseconds. In the allowed 330 microseconds, it can register only about 1% of the maximum change. Since at least a 25% change in mosaic charge is necessary in order to make either of the vidicon or image orthicon suitable for our purpose, the maximum train speed that will permit reading of 7" characters would be only about 10 m.p.h. This is far below the speed and resolution desired. Therefore, the vidicon (or the image orthicon) must be used in a manner other than that which is normal.

The present system obviates the speed of response limits by providing an optical system that permits the desired image of the scene to remain on the tube face for the time necessary for the tube to register a change in charge sufficient to give adequate output. More specifically, Figs. 7 and 8 show diagrammatically how two vidicons 100 and 101 can be used with oscillating mirrors 102 and 103 so that alternate vertical image sections of a car's side are momentarily kept stationary on the respective tube faces, with scanning of one tube being done during the time that the image is stationary on it and while the image on the other tube is being changed. A lens system 104 focuses two succeeding sections of a car upon the two mirrors 102 and 103 which in turn reflect the section images on their respective vidicons 100 and 101. The lens and mirror system is arranged so that each section can be kept stationary on a respective one of the vidicons for a limited part of a cycle of movement of the mirrors with the mirrors synchronized with train motion. In order that a 2-ft. section of the scene can be kept stationary on a vidicon's face, the mirrors 102 and 103 are required to oscillate with a minimum period of approximately $\frac{1}{15}$ of a second at the maximum permissible train speed of about 40 m.p.h. The mirror control will be described in detail later.

With particular reference to Fig. 8, it can be seen that the TV camera 19 includes the pair of charge storage pickup tubes 100 and 101, a high impedance amplifier 105 for producing the vertical sweep voltages, a horizontal sweep generator 106, a blanking amplifier 107, a switching device 108 for causing alternate scanning the image screens of the pickup tubes 100 and 101, and a video transmission circuit 109. Output pulses from the Doppler Radar 23 are applied to the inputs of the vertical sweep amplifier 105, the blanking amplifier 107, and the horizontal sweep generator 106 for synchronizing the sweep circuits with train movement.

In the present system one vertical TV camera sweep is required for each horizontal bit passing the camera. The repetition rate of this sweep correspondingly will vary with the train speed. In order to maintain uniform density on the photographic film 8, the writing speed should be constant at about 270 microseconds per sweep. The vertical sweep generator is, therefore, required to produce a saw tooth current with a variable spacing between the teeth.

Since each element of a freight car is scanned only once, the sweep generator of this system can be quite simple—i.e. the amplifier 105.

The high impedance amplifier 105 may be any one of the number well-known in the art which produces a substantially triangular current output incident to the application of square wave input pulses to its grid. As may be more easily seen in Fig. 8A, the output current of the high impedance amplifier 105, which is applied to the vertical sweep coils of both pickup tubes 100 and 101, has a generally triangular wave form with variable spacing between succeeding linear increases of constant width (270 microseconds). The increasing portion of the wave form is used for scanning. Thus, it can be seen that a linear vertical sweep of a constant time duration, 270 microseconds, is provided with the number of scans coinciding with the number of horizontal train bits passing the camera.

The blanking amplifier 107 amplifies the radar output velocity pulses to a desired voltage level for selective application alternately to the cathodes of the two pickup tubes 100 and 101 permitting alternate operation thereof during their respective scan periods. The output of the blanking amplifier 107 is also connected to the video transmission circuit 109 so that velocity pulses are transmitted over the video cable to the yard office equipment for synchronizing the yard office equipment with train motion.

The horizontal sweep generator 106, which will be described in greater detail below, produces output pulses at a frequency between 0 and 15 cycles per second depending upon and proportional to the train speed. The horizontal sweep generator 106 includes two separate output circuits, one for each of the pickup tubes 100 and 101. The sweep current outputs of the horizontal sweep generator 106 vary in proportion to the number of input pulses from the radar apparatus 23. One sweep cycle for each of the two pickup tubes is produced for each 240 input pulses from the radar apparatus 23. Thus, the outputs of the horizontal sweep generator vary from approximately 0 to 15 c.p.s., depending upon the instantaneous train speed. The horizontal sweep current pulses from each of the two outputs are out of phase so that sweep voltages appear alternately at each of the pickup tubes.

The switch circuit 108 is provided for causing the alternate operation of the TV pickup tubes 100 and 101 for transmission of signals modulated in accordance with the images produced on the screens of the pickup tubes by alternate vertical sections of the passing train. The switch circuit 108 includes a pair of AND circuits 110 and 111 which may be any one of a number of AND circuits well-known in the art. The AND circuits 110 and 111 include separate outputs for the pickup tubes 100 and 101 respectively.

When a current appears at the outputs of the vertical sweep amplifier 105, and the blanking amplifier 107, simultaneously with a positive slope current at the horizontal sweep generator output for one of the pickup tubes, the respective AND circuit 110 or 111 of the switch 108 applies an unblanking voltage to the cathode of said one pickup tube to permit operation of the pickup tube under the control of the vertical and horizontal sweep currents.

Similarly, when the switch circuit 108 detects current outputs at the vertical sweep amplifier 105 and the blanking amplifier 107, simultaneous with a positive slope current at the horizontal sweep generator output of the other pickup tube the respective AND circuit 110 or 111 of the switch circuit 108 applies an unblanking voltage to the cathode of said other pickup tube to permit operation thereof under the control of the vertical and horizontal sweep currents.

In order to prevent output signals during the vertical sweep retrace intervals, a differentiator 117 is interposed between the vertical sweep amplifier 105 and the AND circuits 110 and 111. As is well-known, the differentiator will select and pass the positive slope of each vertical sweep current pulse and reject each negative slope.

The video transmission circuit 109 includes a video amplifier 112 for amplifying the output of the pickup tubes 100 and 101. The output of the amplifier 112 is applied to a mixer stage 113, where it is mixed with output velocity pulses from the blanking amplifier 107. The composite output of the mixer stage 113 is applied to a cathode follower 114 to provide uniform signal strength and is thence fed to the video output cable 5.

In contrast to the simplicity of the vertical sweep generator 105, the requirements for the horizontal sweep generator 106 of the Telefilm camera system are very stringent. The horizontal repetition rate varies from zero to a maximum of about 15 cycles per second when 2 feet of horizontal scan are allowed for the camera tubes. One satisfactory method of producing this sweep is shown in Fig. 9.

Incoming pulses from the Doppler Radar 23 cause an electronic counter 120 to advance, pulses from another source to be described below cause the counter to retreat, and the difference in count is used to adjust the field voltage control 121 of a small high-speed motor 122. Coupled to the motor's shaft 123 is a perforated wheel 124 that cooperates with a lamp 125 to produce light pulses at a rate corresponding to the shaft rotational rate. The light pulses are transformed into electrical pulses by a photocell 126. These pulses are used as the retreat input to the counter 120. This arrangement forms a digital servo-mechanism which stabilizes the motor at a speed which counts down the counter at the same rate that the radar pulses causes the counter to advance.

Speed reducing gears 127 are coupled to the motor shaft 123 to drive two air-dielectric capacitors 128 and 129 with rotors at a desired reduced speed—i.e. between 0 and 15 c.p.s. The changing capacitances 128 and 129 are used to change the frequencies of two oscillators 130 and 131 that are frequency modulated in accordance with the rotational frequency of the capacitors 128 and 129. The outputs of the oscillators 128 and 129 are fed to a pair of discriminators 132 and 133 to produce output voltages varying at the rotational frequency of the capacitors 128 and 129. The outputs of the discriminators are fed to a pair of high impedance amplifiers which produce current outputs of a saw tooth wave form appropriate for the horizontal sweep coils of the TV pickup tubes 100 and 101. The shape and disposition of the capacitors 128 and 129 provide alternate occurrence of output pulses by the amplifiers 134 and 135.

The output current pulses of the amplifiers 134 and 135 are also applied to the AND circuits 110 and 111 (Fig. 8) respectively by way of a pair of differentiators 138 and 139 respectively. The differentiators 138 and 139 will, as is well-known in the television art, select and pass the positive slope of the horizontal sweep currents and reject the negative sweep currents. Thus, the tubes 100 and 101 will not produce outputs during the horizontal retrace time. The motor shaft 123 also drives at the reduced speed a pair of specially shaped cams 136 and 137 which position the mirrors 102 and 103 (Fig. 7) that cause the scene image to be focused on the camera tubes at the appropriate times.

Inasmuch as only narrow vertical sections of the cars are focused on the camera pickup tubes at all times, only a narrow vertical section of each pickup tube screen is used (e.g. .07″). The life of the pickup tubes can be extended to 10,000 hours or more by providing a periodic horizontal shift of the scanning area, for example, in response to the passing of each complete train.

One convenient method of horizontal shifting the utilized screen area is to periodically vary the horizontal scan biasing voltage and to provide simultaneous relative horizontal movement of the pickup tubes 100, 101 and the mirrors, 102, 103. The tubes and mirrors can be relatively moved mechanically in any well-known manner to horizontally shift the image. The scan biasing voltage may be varied in discreet steps to cause scanning to be advanced to succeeding horizontal positions in a manner similar to that to be described later with respect to life extension of the cathode-ray tube of the TV receiver 6.

*Telefilm yard office equipment*

The control circuits for the monitoring cathode-ray tube 32 of the television receiver 6 are shown in Fig. 10.

The requirements for the cathode-ray tube 32 are that it be able to furnish sufficient light for exposing the photographic film and that it have sufficiently fast decay time so that from one vertical sweep to the next there will be no exposure carry-over that might destroy resolution on the film.

Consequently the cathode-ray tube will require the use of one of the many rapid decay phosphors commercially available such as the P-5 and P-16 phosphors which have a decay time of a few microseconds. A typical commercially available flying-spot tube which has been found to be satisfactory is the RCA 5AUP24.

It will be remembered that, as described above, only one very narrow vertical section of the cathode-ray tube is used at any one time to display a single vertical scan. Rapid scanning of the same line will result in rapid blackening of the face, thus shortening the tube life at least in the used section. Accordingly, it is desirable to provide some means for utilizing substantially the entire tube face if maximum tube life is to be realized. Inasmuch as there is no horizontal scanning used in the tube 32, the horizontal sweep coils may be used in a unique manner to be described later for horizontally advancing the utilized vertical section of the tube face in synchronization with train scanning. For example, a preferred method appears to be the advancing of the vertical scan line to successive horizontal positions in response to the passing of each complete train.

The cathode-ray tube circuits will now be described in greater detail. With particular reference to Fig. 10, it will be seen that the cathode-ray tube circuits include an equalizer circuit 150. It may be any one of a number well-known in the art. It will restore the incoming composite video signals to their original transmitted condition by compensating for the amplitude and phase distortion introduced in the signal during transmission over the video cable 5.

The video output from the equalizer circuit 150 is amplified in the video amplifier 151 and then fed to a conventional clipper circuit 152 which passes only the top radar pulse component of the composite video signals. The output of the clipper 152 is fed to a high impedance vertical sweep amplifier 153, similar to the vertical sweep amplifier 105 (Fig. 8) for the TV camera pickup tubes, to produce a vertical sweep current of triangular wave form which is applied to the vertical sweep coils 154 to produce a linear vertical sweep. The output of the vertical sweep amplifier 153 is also applied to one input of a gate circuit 155 which passes the amplified video signals from the video amplifier 151 during the trace time of the cathode-ray tube 32 and which prevents passage of the amplified video signals during the retrace time of the cathode-ray tube 32. The video signals passed by the gate 155 are amplified in the video amplifier 156 and applied to the grid of the cathode-ray tube 32.

The synchronizing radar pulses passed by the clipper circuit 152 are also applied to the input of the film drive control apparatus 38 (Fig. 3) by way of conductor 157. A preferred film drive control may be one substantially the same as the horizontal sweep generator of the TV pickup tubes shown in Fig. 9; and, therefore, it will not be shown in detail. Thus, reference will be made to certain of components of Fig. 9 for the description of the film advance apparatus 38 (Fig. 3). As described above with respect to the horizontal sweep circuits of the TV camera pickup tubes, synchronizing radar pulses will be fed to the counter 120 (Fig. 9) to advance the counter. Pulses produced by the motor driven apertured disc 124 and the photocell 126 cause the counter 120 to retreat. The difference in count is used to adjust the field voltage of the motor 122, thereby to cause operation of the motor at a speed proportional to the rate at which the synchronized radar speed pulses are introduced into the counter.

Speed changing gears (not shown) connect the shaft 123 of the motor 122 to a film advance sprocket 43 (Fig. 3) which advances the film 8 at the rate of one step for each radar speed pulse. Thus, is can be seen that the film 8 and its advancing mechanism 38, 43 provide a horizontal sweep for the receiving apparatus at the yard office 7. In practice, the sprocket 43 may be mechanically connected to other equipment such as the film storage magazine 44.

The projection lens 34 of the film camera 9 is required to focus each cathode-ray tube vertical scan line on the moving film 8. The vertical scan line on the tube 32 may conveniently be approximately three inches and the film image 3/10 inch. This is well within the limitations of commercially available camera equipment. The film may be any one of a number of commercial available types, preferably a low-contrast film of wide tone latitude having an ASA rating of between 10 and 16, for example, Eastman Kodak type 7374 which is designed for recording from P-16 phosphors. In a typical installation, one vertical sweep line on the cathode-ray tube may occupy approximately .001 inch on the film; and, therefore, a one mile train will be reproduced on approximately 30 feet of film.

The horizontal position of the vertical scan line will appear at succeeding horizontal positions on the screen of the cathode-ray tube 32 for each succeeding train. Consequently, provision must be made for assuring proper focusing of the scan line on the film 8. A preferred method is shown wherein the lens 34 focuses the entire screen of tube 32 on one transverse line of the film. Thus, one predetermined film position is exposed irrespective of the position of the vertical scan line.

The film storage magazine 44 may be any commercially available type that will hold as much as 3,000 feet of film, which, in most installations, will accommodate a minimum of a full day's operation without change. A similar film storage magazine 45 is preferably furnished as an integral part of the film viewer 11 for storing the microfilm record subsequent to observation by the yard clerk.

The horizontal sweep circuit (Fig. 11), whereby the utilized vertical section of the cathode-ray tube is shifted one position horizontally for each succeeding train which is scanned, will now be described in detail. Each time that a train reaches the insulated track section 15, the relay 50 (Fig. 5) closes contacts 56 to operate a relay 161 (Fig. 11) in the cathode-ray tube horizontal sweep circuits, by way of D.C. circuit 24. When the relay 161 operates, it closes contacts 162 to complete a circuit for one of two solenoids 168 or 169.

The operation of solenoid 168 or the solenoid 169 incident to the operation of relay 161 will depend upon which one of two limit switches 165 or 166 is closed. The limit switch 165 will be closed by a heliopot 167 when the heliopot has been stepped by the solenoid 169 to one extreme position. The switch 165 will remain closed until the heliopot 167 is subsequently stepped to its opposite extreme position by a solenoid 168. In said opposite extreme position of the heliopot 167, limit switch 166 is closed and remains closed until the solenoid 169 steps the heliopot again to the one extreme position.

When the limit switch 165 closes, it completes an obvious circuit for operating relay 164. Similarly, when the limit switch 166 closes, it completes an obvious circuit for operating relay 163. When relay 163 operates, it closes contacts 172 to prepare a circuit for operating the solenoid 169. When the relay 164 operates, it closes contacts 173 to prepare a circuit for operating the solenoid 168.

Operation of relay 161, when relay 163 is operated, completes a circuit, including contacts 162 and 172, for energizing the solenoid 169. Similarly, operation of relay 161, when relay 164 is operated, completes a circuit, including contacts 162 and 173, for energizing the solenoid 168. The solenoids 168 and 169 respectively actuate ratchet wheels 170 and 171 which in turn advance the heliopot 167 in one direction or the other step by step.

In a typical installation the heliopot may be stepped to successive positions in each direction incident to the passage of 1,200 trains past the check point 4. Movement of the heliopot to succeeding positions causes a varying biasing voltage to be applied to the horizontal sweep coils of the cathode-ray tube 32 to cause the vertical sweep line to appear in succeeding horizontal positions on the tube screen.

As mentioned earlier in the description, a similar system may be used for shifting the images on the television camera pickup tubes 100 and 101.

*Operation of the Telefilm system*

As a train passes the check point 4 (Fig. 2), the Doppler Radar 23 measures its speed and produces output pulses (5–800 c.p.s.) proportional to the speed. The radar pulses cause the vertical sweep amplifier 105 (Fig. 8) to apply sweep currents to the vertical deflection coils of the TV camera pickup tubes 100 and 101.

The radar pulses also cause the horizontal sweep circuits 106 to oscillate the mirrors 102 and 103 (Fig. 7) at a rate (0–15 c.p.s.) proportional to the train speed to momentarily focus alternate 2 foot vertical sections of the train on the screens of the pickup tubes 100 and 101. The mirrors 102 and 103 are rotated out of phase by cams 136 and 137 (Fig. 9) such that the image on each screen is maintained stationary as the image on the other screen is being changed.

The capacitors 128 and 129 in the horizontal sweep circuits 106 are rotated in synchronism with the mirror positioning cams to produce sweep voltages at the outputs of the amplifiers 134 and 135 for application to the horizontal deflection coils of the TV pickup tubes 100 and 101 while the mirrors 102 and 103 maintain succeeding vertical train section images stationary on the screens of tubes 100 and 101.

The switch circuit 108 (Fig. 8) prepares the tube 100 for operation, when the amplifier 134 (Fig. 9) applies a positive slope horizontal sweep pulse to the horizontal deflection coils of tube 100, during which interval the screen image is held stationary by mirror 102. The switch circuit 108 prepares the tube 101 for operation when the amplifier 135 applies a positive slope sweep pulse to the horizontal deflection coils of tube 101, during which interval the image is held stationary by mirror 103.

During the intervals of operation of each tube 100 and 101 consequent to the application of one horizontal sweep voltage pulse to its respective deflection coils, its vertical sweep coils produce a plurality of vertical scan cycles— i.e. 240 vertical scans during one horizontal sweep cycle.

The video output signals from the tubes 100 and 101 are mixed with radar synchronizing pulses from the unblanking amplifier 107 (Fig. 8) and are applied to the video cable 5.

The video signals received at the yard office 7 are applied to grid of the cathode-ray tube 32 (Fig. 10). The radar pulses control the vertical sweep coils 154 of the cathode-ray tube 32 to cause the car images to be reproduced on the screen of tube 32 line by line.

The radar pulses are control the film advance apparatus 38 (Fig. 3) to advance the film 8 a predetermined distance (e.g. .001") for each vertical line displayed on the screen of the cathode-ray tube 32, thereby providing a horizontal sweep.

The exposed film 8 is automatically fed to the film processor 10. A clerk will manually advance the processed film 8 through the viewer 11, utilizing the recorded information as required.

In the event that the Telefilm system must reproduce images of trains approaching from either of two directions, provision must be made to provide horizontal scanning pulses for each pickup tube while its respective mirror 102 or 103 moves through that part of its cycle of movement during which the image is held stationary on the respective tube screen. The images must be held stationary on the tube screens for two different directions of travel. This can be provided quite simply by using another set of cams (not shown) similar to but 180° out of phase with cams 136 and 137. One set of cams or the other, depending on the direction of the train approach, will actuate the mirrors 102 and 103 to produce a stationary image on pickup tubes in synchronism with the horizontal sweep pulses.

The relays 83 and 84 of Fig. 6A can be used to energize or deenergize a solenoid (not shown) to cause cams 136, 137 or the other cam set (not shown) to engage and rock the mirrors 102 and 103. The relays 83 and 84 and their related circuits in Fig. 6A will, as described above, pass signals only when a passing train is moving forwardly in relation to its direction of approach.

It is apparent that only one television pickup tube need be used in the system if speeds up to 20 m.p.h. are to be scanned. Also, more than two pickup tubes can be utilized for speeds greater than 40 m.p.h.

It is also apparent that the TV camera and the mirrors 102 and 103 can be adapted to focus, on the pickup tubes 100 and 101, horizontal train sections sufficiently long to cover most of the useable horizontal length of the tubes. Scanning of a particular vertical section of each tube would proceed as described earlier with respect to the preferred embodiment. However, horizontal shifting of the scanned section would be accomplished merely by varying the horizontal scan biasing voltage with no change in the relative mirror and pickup tube positioning.

While there has been described what is at present believed to be the preferred embodiment of the invention, various changes and modifications may be made therein; and it is contemplated to cover in the appended claims all such changes and modifications as fall within the true spirit and scope of the invention.

What is claimed is:

1. A system for photographically reproducing information carried on the sides of railroad cars comprising a television camera located adjacent a trackside check point and adapted to be focused upon the sides of railroad cars passing thereby, apparatus for determining the speed of the cars as they pass the check point, the television camera including means controlled by the apparatus and effective at all normal railroad car speeds for causing high resolution video output signals corresponding to the car images focused upon the television camera, a television receiver controlled by the apparatus for reproducing the car images in accordance with the video signals, and photographic equipment including film controlled by the apparatus for photographically reproducing the car images reproduced by the television receiver.

2. A system for photographically reproducing information carried on the sides of railroad cars comprising a television camera located in close proximity to a trackside check point and adapted to be focused upon the sides of railroad cars passing thereby, electrical apparatus mechanically independent of the cars for determining the speed of the cars as they pass the check point, the television camera including means operated by the apparatus in synchronism with the movement of the cars and effective at car speeds at least as high as 40 miles per hour for causing high resolution video output signals corresponding to the car images focused upon the television camera, a television receiver operated by the apparatus in synchronism with the movement of the cars for reproducing the car images in accordance with the video signals, and photographic equipment including film operated by the apparatus in synchronism with the movement of the cars for photographically reproducing the car images reproduced by the television receiver.

3. A system for photographically reproducing information carried on the sides of railroad cars comprising: a television camera located adjacent a trackside check point and adapted to be focused upon the sides of railroad cars passing thereby; apparatus for producing signals proportional in frequency to the speed of the cars as they pass the check point; camera scanning apparatus, including vertical and horizontal sweep circuits controlled by the apparatus speed signals, for causing video output signals corresponding to the car images focused upon the television camera; a television receiver, including a sweep circuit controlled by the apparatus speed signals, for causing the receiver to reproduce the car images in accordance with the video signals; and photographic equipment, including film and a film advancing mechanism controlled by the apparatus speed signals, for photographically reproducing the car images reproduced by the television receiver.

4. A system for photographically reproducing information carried on the sides of railroad cars comprising: a television camera located adjacent a trackside check point and adapted to be focussed upon the sides of railroad cars passing thereby; apparatus for producing signals proportional in frequency to the speed of the cars passing the check point in a predetermined direction at speeds above a predetermined minimum; camera scanning apparatus, including vertical and horizontal sweep circuits controlled by the apparatus speed signals, for causing video output signals corresponding to the car images focused upon the television camera; a television receiver including a sweep circuit controlled by the apparatus signals, for causing the receiver to reproduce the car images in accordance with the video signals; and photographic equipment, including film and a film advancing mechanism controlled by the apparatus speed signals, for photographically reproducing the car images reproduced by the television receiver, whereby images of the cars are reproduced as the cars move forwardly and are rejected when the cars stop or back up.

5. A system for photographically reproducing information carried on the sides of railroad cars comprising: a television camera located adjacent the trackside check point; apparatus for producing signals proportional in frequency to the speed of the cars as they pass the check point; camera scanning apparatus, including vertical and horizontal sweep circuits controlled by the apparatus speed signals, for producing spaced video output signals corresponding to succeeding vertical lines of the passing cars; a television receiver, including a screen and including vertical sweep circuits controlled by the apparatus speed signals, for intermittently reproducing, at one vertical line on the screen, successive vertical lines of the car images in accordance with the spaced video signals; and photographic equipment, including film and a film advancing mechanism controlled by the apparatus speed signals, for photographically reproducing, on succeeding transverse film sections, the car image lines reproduced by the receiver.

6. A system for photographically reproducing information carried on the sides of railroad cars comprising: a television camera, including image screen means, located adjacent the trackside check point; apparatus for producing signals proportional in frequency to the speed of the cars as they pass the check point; mechanism controlled by the signals for maintaining stationary images of successive vertical sections of the passing car sides on the screen means for predetermined intervals; camera scanning apparatus, including vertical and horizontal sweep circuits controlled by the apparatus speed signals, for producing spaced video output signals corresponding to the successive vertical car sections; a television receiver, including a screen and including vertical sweep circuits controlled by the apparatus speed signals, for intermittently reproducing, at one vertical section of the screen, successive vertical lines of the car images in accordance with the spaced video signals; and photographic equipment, including film and a film advancing mechanism controlled by the apparatus speed signals, for photographically reproducing, on successive transverse film sections, the car image lines reproduced by the receiver.

7. A system for photographically reproducing information carried on the sides of railroad cars comprising: a television camera, including image screen means, located adjacent the trackside check point; apparatus for producing signals proportional in frequency to the speed of the cars as they pass the check point; mechanism controlled by the signals for maintaining stationary images of successive vertical sections of the passing car sides on part of the screen means for predetermined intervals; camera scanning apparatus, including vertical and horizontal sweep circuits controlled by the apparatus speed signals, for producing spaced video output signals corresponding to the successive vertical car sections; intermittently operated means for cyclically changing the part of the screen means on which the car images are maintained and scanned to lengthen camera life; a television receiver, including a screen and including vertical sweep circuits controlled by the apparatus speed signals, for intermittently reproducing, at one vertical section of the screen, successive vertical lines of the car images in accordance with the spaced video signals; and photographic equipment, including film and a film advancing mechanism controlled by the apparatus speed signals, for photographically reproducing, on successive transverse film sections, the car image lines reproduced by the receiver.

8. A system for photographically reproducing information carried on the sides of railroad cars comprising: a television camera located adjacent the trackside check point; apparatus for producing signals proportional in frequency to the speed of the cars as they pass the check point; camera scanning apparatus, including vertical and horizontal sweep circuits controlled by the apparatus speed signals, for producing spaced video output signals corresponding to successive vertical lines of the passing cars; a television receiver, including a screen and including vertical sweep circuits controlled by the apparatus speed signals, for intermittently reproducing, at one vertical line on the screen, successive vertical lines of the car images in accordance with the spaced video signals; means for cyclically advancing the one vertical screen section of the receiver one step horizontally; and photographic equipment, including film and a film advancing mechanism controlled by the apparatus speed signals, for photographically reproducing, on successive transverse film sections, the car image lines reproduced by the receiver.

9. The combination claimed in claim 8 wherein the photographic equipment focuses the entire receiver screen on one line transverse to and in the path of the moving film.

10. A system for photographically reproducing information carried on the sides of railroad cars comprising: a television camera located adjacent the trackside check point; apparatus for producing signals proportional in frequency to the speed of cars passing the check point at speeds above a predetermined low minimum; camera scanning apparatus, including vertical and horizontal sweep circuits controlled by the apparatus speed signals, for producing spaced video output signals corresponding to successive vertical lines of the passing cars; a television receiver, including a screen and including vertical sweep circuits controlled by the apparatus speed signals, for intermittently reproducing, at one vertical line on the screen, successive vertical lines of the car images in accordance with the spaced video signals; and photographic equipment, including film and a film advancing mechanism controlled by the apparatus speed signals, for photographically reproducing, on successive transverse film sections, the car image lines reproduced by the receiver.

11. A system for photographically reproducing information carried on the sides of railroad cars comprising: a television camera located adjacent the trackside check point; apparatus for producing signals proportional in frequency to the speed of the cars passing the check point in a predetermined direction at speeds above a predetermined minimum; camera scanning apparatus, including vertical and horizontal sweep circuits controlled by the apparatus speed signals, for producing spaced video output signals corresponding to successive vertical lines of the passing cars; a television receiver, including a screen and including vertical sweep circuits controlled by the apparatus speed signals, for intermittently reproducing, at one vertical section of the screen, successive vertical lines of the car images in accordance with the spaced video signals; and photographic equipment, including film and a film advancing mechanism controlled by the apparatus speed signals, for photographically reproducing, on successive transverse film sections, the car image lines reproduced by the receiver, whereby images of the cars are reproduced as the cars move forwardly and are rejected when the cars stop or back up.

12. A system for photographically reproducing information carried on the sides of railroad cars comprising a television camera located adjacent a trackside check point and adapted to be focused upon the sides of railroad cars passing thereby, apparatus for determining the speed of the cars as they pass the check point, a pair of pickup tubes in the camera, mechanism controlled by the apparatus for maintaining stationary images of succeeding vertical sections of the car sides alternately in each of the pickup tubes for predetermined intervals as the sections pass the check point, the camera including circuit means controlled by the apparatus for scanning each stationary image on the pickup tubes and for producing video signals corresponding to the images, a television receiver controlled by the apparatus for reproducing the car images in accordance with the video signals, and photographic equipment including film controlled by the apparatus for photographically reproducing the car images reproduced by the television receiver.

13. A system for photographically reproducing information carried on the sides of railroad cars comprising a television camera located adjacent a trackside check point and adapted to be focused upon the sides of railroad cars passing thereby, apparatus for determining the speed of the cars as they pass the check point, a pair of pickup tubes in the camera, mechanism operated by the apparatus in synchronism with the movement of the cars for maintaining stationary images of succeeding vertical sections of the car sides alternately in each of the pickup tubes for predetermined intervals as the sections pass the check point, the camera including circuit means operated by the apparatus in synchronism with the movement of the cars for scanning each stationary image on the pickup tubes to produce video output signals corresponding to the car images, television receiver operated by the apparatus in synchronism with the movement of the cars for reproducing the car images in accordance with the video signals, and photographic equipment including film operated by the apparatus in synchronism with the movement of the cars for photographically reproducing the car images reproduced by the receiver.

14. A system for photographically reproducing information carried on the sides of railroad cars comprising: a television camera located adjacent a trackside check point and adapted to be focused upon the sides of railroad cars passing thereby; apparatus for producing signals proportional in frequency to the speed of the cars as they pass the check point; a plurality of pickup tubes in the camera; mechanism controlled by the apparatus signals for maintaining stationary images of succeeding vertical sections of the car sides sequentially in succeeding pickup tubes for predetermined intervals as the sections pass the check point; camera scanning apparatus, including vertical and horizontal sweep circuits controlled by the apparatus speed signals, for scanning each image on the pickup tubes during the interval that it is stationary to produce video signals corresponding to the image; a television receiver for reproducing the car images in accordance with the video signals; the receiver including a sweep circuit controlled by the apparatus speed signals for synchronizing the operation of the receiver with the television camera operation and with the motion of the passing cars; photographic equipment, including film and a film advancing mechanism controlled by the apparatus speed signals, for photographically reproducing the car images reproduced by the television receiver.

15. A system for photographically reproducing information carried on the sides of railroad cars comprising: a television camera located adjacent a trackside check point and adapted to be focused upon the sides of railroad cars passing thereby; apparatus for producing signals proportional in frequency to the speed of the cars passing the check point in a selected direction at speeds above a predetermined minimum; a plurality of pickup tubes in the camera; mechanism controlled by the apparatus signals for maintaining stationary images of succeeding vertical sections of the car sides sequentially in succeeding pickup tubes for predetermined intervals as the sections pass the check point; camera scanning apparatus, including vertical and horizontal sweep circuits controlled by the apparatus speed signals, for scanning each image on the pickup tubes during the interval that it is stationary to produce video signals corresponding to the image; a television receiver for reproducing the car images in accordance with the video signals; the receiver including a sweep circuit controlled by the apparatus speed signals for synchronizing the operation of the receiver with the television camera operation and with the motion of the passing cars; photographic equipment, including film and a film advancing mechanism controlled by the apparatus speed signals, for photographically reproducing the car images reproduced by the television receiver, whereby images of the cars are reproduced as the cars move forwardly and are rejected when the cars stop or back up.

16. A system for photographically reproducing information carried on the sides of railroad cars comprising: a television camera located adjacent a trackside check point and adapted to be focused upon the sides of railroad cars passing thereby; apparatus for producing signals proportional in frequency to the speed of the cars as they pass the check point; a pair of pickup tubes in the camera; mechanism controlled by the apparatus signals for maintaining stationary images of succeeding vertical sections of the car sides alternately on each of the pickup tubes for predetermined intervals as the sections pass the check point; camera scanning apparatus, including a switching circuit and vertical and horizontal sweep circuits, controlled by the apparatus signals for scanning each image on the pickup tubes during the interval that it is stationary to produce video signals corresponding to the image; a television receiver, including a screen, for reproducing car images in accordance with the video signals; the receiver including a switching circuit and a vertical sweep circuit controlled by the apparatus signals for causing the receiver to intermittently reproduce, at one vertical section of the screen, successive vertical lines of the car images; and photographic equipment, including film and film advancing mechanism, controlled by the apparatus signals for photographically reproducing the car images reproduced by the television receiver.

17. A system for photographically reproducing information carried on the sides of railroad cars comprising: a television camera located adjacent a trackside check point and adapted to be focused upon the sides of railroad cars passing thereby; apparatus for producing signals proportional in frequency to the speed of the cars as they pass the check point; a pair of pickup tubes in the camera; mechanism conrtolled by the apparatus signals for maintaining stationary images of succeeding vertical sections of the car sides alternately on each of the pickup tubes for predetermined intervals as the sections pass the check point; camera scanning apparatus, including a switching circuit and vertical and horizontal sweep circuits, controlled by the apparatus signals for scanning each image on the pickup tubes during the interval that it is stationary to produce video signals corresponding to the image; a television receiver, including a screen, for reproducing car images in accordance with the video signals; the receiver including a switching circuit and a vertical sweep circuit controlled by the apparatus signals for causing the receiver to intermittently reproduce, at one vertical section of the screen, successive vertical lines of the car images; means for periodically advancing the one vertical screen section of the receiver one step horizontally; and photographic equipment, including film and film advancing mechanism, controlled by the apparatus signals for photographically reproducing the car images reproduced by the television receiver.

18. The combination claimed in claim 17 wherein the photograph equipment focuses the entire receiver screen on one line transverse to and in the path of the moving film.

19. A system for photographically reproducing information carried on the sides of railroad cars comprising: a television camera including an image screen located adjacent a trackside check point and adapted to be focused upon the sides of railroad cars passing thereby; apparatus for producing signals proportional in frequency to the speed of the cars as they pass the check point; a pair of pickup tubes in the camera; mechanism controlled by the apparatus signals for maintaining stationary images of succeeding vertical sections of the car sides alternately on a predetermined vertical section of the screen of each pickup tube for predetermined intervals as the sections pass the check point; camera scanning apparatus, including a switching circuit and vertical and horizontal sweep circuits, controlled by the apparatus signals for scanning each image on the pickup tubes during the interval that it is stationary to produce video signals corresponding to the image; means for periodically advancing the predetermined vertical screen sections one step horizontally; a television receiver, including a screen, for reproducing car images in accordance with the video signals; the receiver including a switching circuit and a vertical sweep circuit controlled by the apparatus signals for causing the receiver to intermittently reproduce, at one vertical section of the screen, successive vertical lines of the car images; and photographic equipment, including film and film advancing mechanism, controlled by the apparatus signals for photographically reproducing the car images reproduced by the television receiver.

20. A system for photographically reproducing information carried on the sides of railroad cars comprising: a television camera located adjacent a trackside check point and adapted to be focused upon the sides of railroad cars passing thereby; apparatus for producing signals proportional in frequency to the speed of the cars passing the check point in a predetermined direction at speeds above a predetermined minimum; a pair of pickup tubes in the camera; mechanism controlled by the apparatus signals for maintaining stationary images of succeeding vertical sections of the car sides alternately on each of the pickup tubes for predetermined intervals as the sections pass the check point; camera scanning apparatus, including a switching circuit and vertical and horizontal sweep circuits, controlled by the apparatus signals for scanning each image on the pickup tubes during the interval that it is stationary to produce video signals corresponding to the image; a television receiver, including a screen, for reproducing car images in accordance with the video signals; the receiver including a switching circuit and a vertical sweep circuit controlled by the apparatus signals for causing the receiver to intermittently reproduce, at one vertical section of the screen, successive vertical lines of the car images; and photographic equipment, including film and film advancing mechanism, controlled by the apparatus signals for photographically reproducing the car images reproduced by the television receiver, whereby images of the cars are reproduced as the cars move forwardly and are rejected when the cars stop or back up.

21. A system for photographically reproducing information carried on the sides of railroad cars initially passing a trackside check point in a certain direction comprising a television camera located adjacent the check point and adapted to be focused upon the sides of the railroad cars passing thereby, apparatus for determining the speed and direction of the cars as they pass the check point, the television camera including means controlled by the apparatus as long as the cars pass the check point in the certain direction for causing video output signals corresponding to the car images focused upon the television camera, a television receiver controlled by the apparatus for reproducing the car images in accordance with the video signals, and photographic equipment including film controlled by the apparatus for photographically reproducing the car images reproduced by the television receiver.

22. A system for photographically reproducing information carried on the sides of railroad cars initially passing a trackside check point in either direction comprising a television camera located adjacent the check point and adapted to be focused upon the sides of the railroad cars passing thereby, apparatus for determining the speed, initial direction of the cars as they pass the check point, the television camera including means controlled by the apparatus as long as the cars pass the check point in the initial direction at speeds above a predetermined minimum for causing video output signals corresponding to the car images focused upon the television camera, a television receiver controlled by the apparatus for reproducing the car images in accordance with the video signals, and photographic equipment including film controlled by the apparatus for photographically reproducing the car images reproduced by the television receiver, whereby images of the cars are reproduced as the cars move forwardly and are rejected when the cars stop or back up.

References Cited in the file of this patent

UNITED STATES PATENTS

| | | |
|---|---|---|
| 2,629,865 | Barker | Feb. 24, 1953 |
| 2,785,395 | Platzman | Mar. 12, 1957 |
| 2,798,116 | Wiens | July 2, 1957 |

OTHER REFERENCES

"Switchyard Television Facilitates Movement of Rolling Stock," page 116, Popular Mechanics, November 1952 (copy in U.S. Patent Office Library).

UNITED STATES PATENT OFFICE
CERTIFICATE OF CORRECTION

Patent No. 2,956,117 October 11, 1960

Edward W. Ernst et al.

It is hereby certified that error appears in the printed specification of the above numbered patent requiring correction and that the said Letters Patent should read as corrected below.

Column 5, lines 64 and 65, for "centimeter" read -- centimeters --; column 6, line 70, for "pulse" read -- pulses --; column 14, line 17, for "are" read -- also --.

Signed and sealed this 11th day of April 1961.

(SEAL)
Attest:
ERNEST W. SWIDER

Attesting Officer

ARTHUR W. CROCKER
Acting Commissioner of Patents